US008788666B2

(12) United States Patent
Adithe Venkata Ram et al.

(10) Patent No.: US 8,788,666 B2
(45) Date of Patent: Jul. 22, 2014

(54) SYSTEM AND METHOD OF CONSOLIDATED CENTRAL USER ADMINISTRATIVE PROVISIONING

(75) Inventors: Sarma Adithe Venkata Ram, Sunnyvale, CA (US); Madhu Gourineni, Foster City, CA (US); Neha Garg, Uttar Pradesh (IN)

(73) Assignee: SAP AG, Walldorf (DE)

( * ) Notice: Subject to any disclaimer, the term of this patent is extended or adjusted under 35 U.S.C. 154(b) by 958 days.

(21) Appl. No.: 12/347,839

(22) Filed: Dec. 31, 2008

(65) Prior Publication Data

US 2010/0169488 A1  Jul. 1, 2010

(51) Int. Cl.
  G06F 15/173  (2006.01)
  G06Q 10/10  (2012.01)
  G06F 17/30  (2006.01)
  G06Q 10/06  (2012.01)

(52) U.S. Cl.
  CPC .............. *G06Q 10/10* (2013.01); *G06Q 10/103* (2013.01); *G06F 17/30557* (2013.01); *G06Q 10/06* (2013.01); *Y10S 707/99944* (2013.01); *G06F 17/30418* (2013.01)
  USPC ...................... 709/226; 709/208; 707/999.103

(58) Field of Classification Search
  USPC ................... 709/208–211, 223–226; 719/328
  See application file for complete search history.

(56) References Cited

U.S. PATENT DOCUMENTS

| | | | |
|---|---|---|---|
| 6,253,257 B1 * | 6/2001 | Dundon | 719/331 |
| 6,523,027 B1 * | 2/2003 | Underwood | 1/1 |
| 6,711,579 B2 * | 3/2004 | Balakrishnan | 1/1 |
| 6,842,892 B1 * | 1/2005 | Goldberg et al. | 717/108 |
| 7,080,092 B2 * | 7/2006 | Upton | 1/1 |
| 7,315,980 B2 * | 1/2008 | Anderson et al. | 715/255 |
| 7,441,024 B2 * | 10/2008 | Sanghvi et al. | 709/223 |
| 7,716,357 B2 * | 5/2010 | Milligan et al. | 709/231 |
| 2002/0002579 A1 * | 1/2002 | Holden et al. | 709/200 |
| 2002/0046301 A1 * | 4/2002 | Shannon et al. | 709/328 |
| 2002/0120685 A1 * | 8/2002 | Srivastava et al. | 709/203 |
| 2002/0174000 A1 * | 11/2002 | Katz et al. | 705/7 |
| 2003/0204522 A1 * | 10/2003 | Gallagher et al. | 707/102 |
| 2004/0024764 A1 * | 2/2004 | Hsu et al. | 707/9 |
| 2004/0040031 A1 * | 2/2004 | Sweitzer et al. | 719/328 |
| 2004/0148586 A1 * | 7/2004 | Gilboa | 717/108 |
| 2004/0226026 A1 * | 11/2004 | Glass et al. | 719/328 |
| 2004/0243422 A1 * | 12/2004 | Weber et al. | 705/1 |
| 2005/0021348 A1 * | 1/2005 | Chan et al. | 705/1 |
| 2005/0021354 A1 * | 1/2005 | Brendle et al. | 705/1 |
| 2005/0027795 A1 * | 2/2005 | San Andres et al. | 709/203 |
| 2005/0027796 A1 * | 2/2005 | San Andres et al. | 709/203 |
| 2005/0038869 A1 * | 2/2005 | Zimler et al. | 709/217 |
| 2005/0120021 A1 * | 6/2005 | Tang et al. | 707/10 |

(Continued)

OTHER PUBLICATIONS

Davies et al., Connect WebSphere Service-Oriented middleware to SAP, May 2007.*

*Primary Examiner* — Andrew Goldberg
(74) *Attorney, Agent, or Firm* — Fountainhead Law Group PC

(57) ABSTRACT

In one embodiment the present invention includes a computer-implemented method of reducing a quantity of business application programming interface (BAPI) calls in a hardware client-server environment. The method includes configuring a centralized provisioning system on a hardware server with access definitions for systems. The method further includes receiving, by the centralized provisioning system, a provisioning request for a user of a client to access the systems. The method further includes determining a collected BAPI call according to the access definitions. The method further includes providing access to the user according to the collected BAPI call.

30 Claims, 5 Drawing Sheets

(56) References Cited

U.S. PATENT DOCUMENTS

| | | | |
|---|---|---|---|
| 2005/0256896 A1* | 11/2005 | Pfeifer et al. | 707/102 |
| 2006/0112123 A1* | 5/2006 | Clark et al. | 707/101 |
| 2006/0123062 A1* | 6/2006 | Bobbitt et al. | 707/200 |
| 2007/0130152 A1* | 6/2007 | Kosov et al. | 707/10 |
| 2007/0209042 A1* | 9/2007 | Mullan et al. | 719/328 |
| 2007/0276804 A1* | 11/2007 | Khan et al. | 707/3 |
| 2008/0016580 A1* | 1/2008 | Dixit et al. | 726/27 |
| 2008/0059722 A1* | 3/2008 | Charra et al. | 711/154 |
| 2008/0120302 A1* | 5/2008 | Thompson et al. | 707/9 |
| 2008/0183528 A1* | 7/2008 | Chieu et al. | 705/7 |
| 2008/0184140 A1* | 7/2008 | Koerner | 715/762 |
| 2008/0271061 A1* | 10/2008 | Branson et al. | 719/328 |
| 2009/0300181 A1* | 12/2009 | Marques | 709/226 |
| 2010/0299680 A1* | 11/2010 | Macgaffey et al. | 719/328 |

* cited by examiner

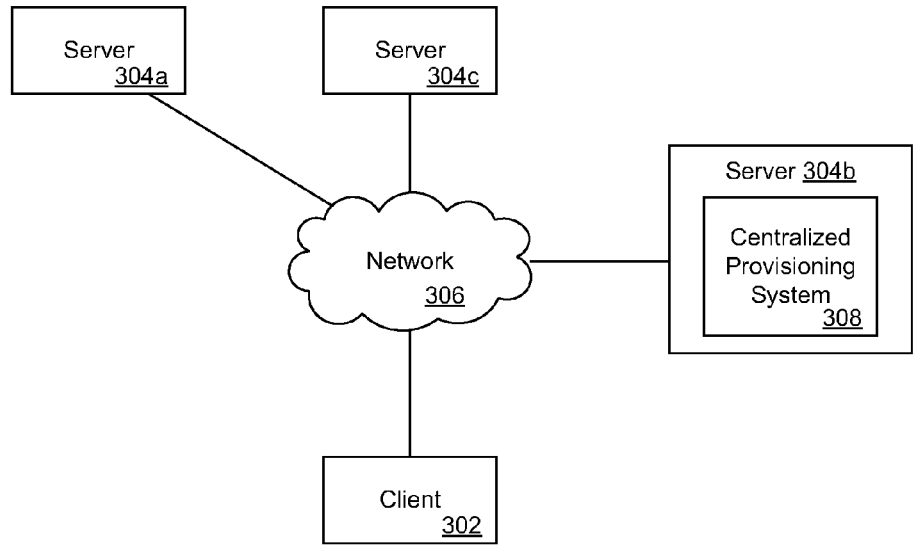

FIG. 3

```
CREATE TABLE "CHILD_CUA"
(
"CHILD_CUA_SYSTEM" NVARCHAR2(40) DEFAULT ' ' NOT NULL,
"CONSIDER_FOR_CUA" NVARCHAR2(40) DEFAULT ' ' NOT NULL,
"PARENT_CUA_SYSTEM" NVARCHAR2(40) DEFAULT ' ' NOT NULL
)
 ALTER TABLE "VT_AR_CHILD_CUA"
ADD PRIMARY KEY ("CHILD_CUA_SYSTEM")
NOT DEFERRABLE INITIALLY IMMEDIATE ENABLE VALIDATE
```

FIG. 4A

```
CREATE TABLE "BAPI_MAP_SYS"
(
"FUNCTION_ID" NVARCHAR2(80) DEFAULT ' ' NOT NULL,
"SYSNAME" NVARCHAR2(80) DEFAULT ' ' NOT NULL,
"BAPI_NAME" NVARCHAR2(120) DEFAULT ' ' NOT NULL,
"BAPI_TYPE" NVARCHAR2(80) DEFAULT ' ' NOT NULL
)
 ALTER TABLE "BAPI_MAP_SYS"
```

FIG. 4B

SYSTEM AND METHOD OF CONSOLIDATED CENTRAL USER ADMINISTRATIVE PROVISIONING

CROSS REFERENCE TO RELATED APPLICATIONS

Not applicable.

BACKGROUND

The present invention relates to user administrative provisioning, and in particular, to user administrative provisioning in a heterogeneous computing environment.

Unless otherwise indicated herein, the approaches described in this section are not prior art to the claims in this application and are not admitted to be prior art by inclusion in this section.

BAPIs (Business Application Programming Interfaces) are a set of interfaces to object-oriented programming methods that enable a programmer to integrate third-party software into the proprietary R/3 enterprise resource planning product from SAP. For specific business tasks such as uploading transactional data, BAPIs are implemented and stored in the R/3 system as remote function call (RFC) modules.

BAPIs play an important role in the technical integration and in the exchange of business data between SAP components, and between SAP and non-SAP components. BAPIs enable one to integrate these components and are therefore an important part of developing integration scenarios where multiple components are connected to each other, either on a local network or on the internet.

BAPIs allow integration at the business level, abstracted above the technical level. This provides for greater stability of the linkage and independence from the underlying communication technology. BAPIs allow object-oriented access to the SAP system through methods for the business object types. Together with the business object types, BAPIs define and document the interface standard at the business level.

One area that involves BAPIs is user access to data. The data may be stored on multiple computer systems, so BAPIs help to provide access between the multiple components. The standard way to provide access is to call a BAPI for every system to be accessed.

SUMMARY

Embodiments of the present invention improve user access to data by reducing the number of BAPI calls. In one embodiment the present invention includes a computer-implemented method of reducing a quantity of business application programming interface (BAPI) calls in a hardware client-server environment. The method includes configuring a centralized provisioning system on a hardware server with access definitions for systems. The method further includes receiving, by the centralized provisioning system, a provisioning request for a user of a client to access the systems. The method further includes determining a collected BAPI call according to the access definitions. The method further includes providing access to the user according to the collected BAPI call.

The following detailed description and accompanying drawings provide a better understanding of the nature and advantages of the present invention.

BRIEF DESCRIPTION OF THE DRAWINGS

FIG. 3 is a block diagram of a client server environment according to an embodiment of the present invention.

FIGS. 4A-4B illustrate tables structures for CUA data according to an embodiment of the present invention.

DETAILED DESCRIPTION

Described herein are techniques for user administrative provisioning. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Provisioning is the process of managing access and entitlement rights to electronic services and resources. These services and resources are those services and resources used in an organization and managed by their information technology support people. The access and entitlement rights are for users and system. Management is a complete lifecycle management process—e.g. setup, change, revoke, audit, and the like. Provisioning is the act of preparing access and entitlement rights prior to first access.

Although the description below is specifically addressed to BAPIs, such references are for brevity. It is to be understood that embodiments of the present invention are also applicable to other types of system integration interfaces, such as web services and Common Object Requesting Broker Architecture (CORBA) interfaces.

Figure 1:
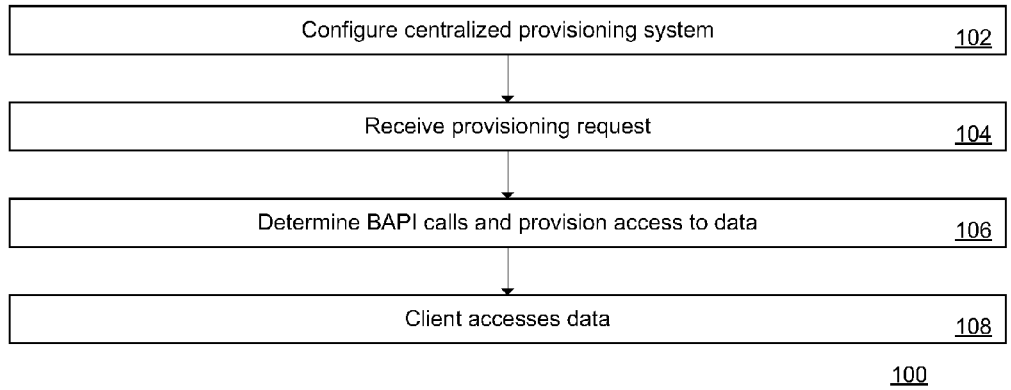
FIG. 1 is a flow diagram of a method of determining BAPI calls according to an embodiment of the present invention.

FIG. 1 is a flow diagram of a method 100 of determining BAPI calls according to an embodiment of the present invention. The method 100 may be implemented as one or more computer programs that are executed in a hardware client-server computing environment (see FIG. 3 for more details).

In box 102, a centralized provisioning system is provided, and the centralized provisioning system is configured with the access definitions of the systems for which the centralized provisioning system is managing access. The centralized provisioning system may be implemented as a computer program executed by a hardware server in the hardware client-server computing environment. The access definitions define the characteristics of the systems for which the centralized provisioning system is managing provisioning, as further detailed below.

The centralized provisioning system manages access to data stored in the hardware client-server computing environment. The centralized provisioning system works with both distributed access systems and consolidated access systems.

In distributed access systems, access is defined on one system and the data is federated. Protocols like SOAP (formerly Simple Object Access Protocol) and Security Assertion Markup Language (SAML) may be used. SAML is an XMLbased (Extensible Markup Language) standard for exchanging authentication and authorization data between systems. Other techniques exist under the rubric of Provisioning-System-to-Provisioning-Systems.

In centralized access systems, access is defined on a centralized system, and the access data to other systems is maintained on the centralized system. The other systems then access the centralized system for the access data. This may also be referred to as Central User Administration (CUA). A CUA layout is one CUA and many child systems. Furthermore, there can be multiple CUAs in a client-server environment; for example, different vendors of systems, different versions of systems, etc.

In provisioning, the most complex landscape of systems is a mix of at least one CUA having child systems and at least one system without a parent CUA system in the CUA system level configuration. Furthermore, in addition to the multiple CUAs, there may also be non-CUA (distributed) systems in the landscape. Further details regarding configuration of the centralized provisioning service are provided below.

In box 104, the centralized provisioning system receives a provisioning request. The request may result from a system administrator configuring the centralized provisioning system, as discussed in more detail below. The request may be received from a client in the client-server environment in response to a user request to access data. (This may be contrasted with many existing client systems, which generate a multitude of BAPI calls in response to a provisioning request when the data is managed by a multitude of systems.)

In box 106, the centralized provisioning system determines the BAPI calls involved in meeting the provisioning request and produces a collected BAPI call. To make this determination, the centralized provisioning system uses the access definitions (see box 102). The centralized provisioning system then makes the collected BAPI call. Further details regarding box 106 are provided with reference to FIG. 2.

In box 108, the client accesses the data as provisioned according to the collected BAPI call (see box 106). The data may include application data from an application server, database data from a database server, etc. according to a three-tier architecture. For example, the provisioning may include access to a particular application stored (or executed) by the application server, or access to particular data stored by the database server.

In the above manner, the number of BAPI calls may be minimized.

Figure 2:
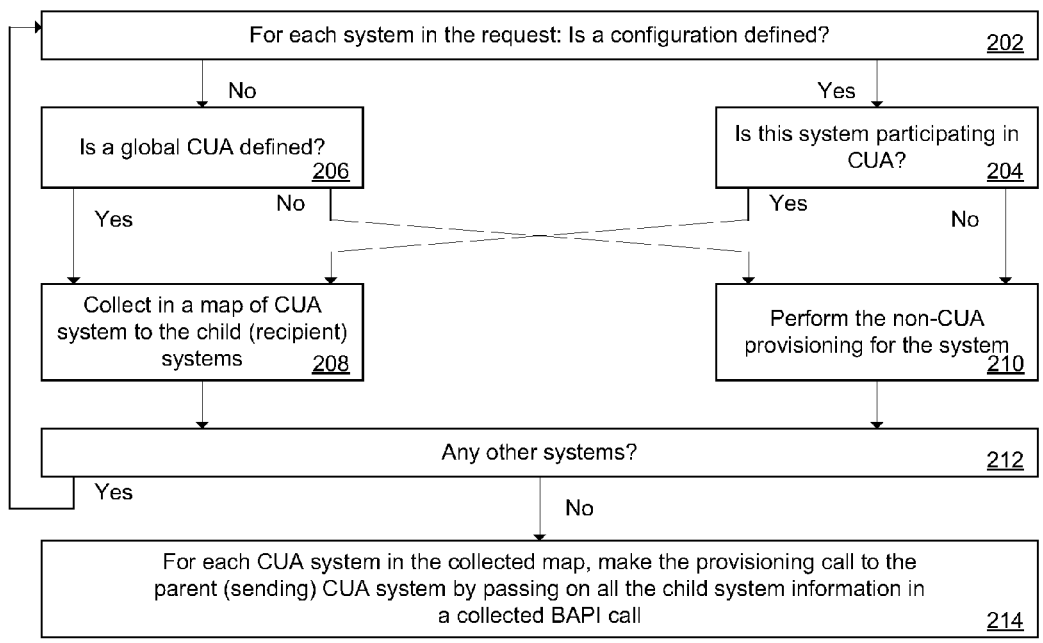
FIG. 2 is a flow diagram showing more details of box 106 (see FIG. 1) according to an embodiment of the present invention.

FIG. 2 is a flow diagram showing more details of box 106 (see FIG. 1) according to an embodiment of the present invention. The subboxes of the box 106 may be implemented as one or more computer programs that are executed in a hardware client-server computing environment (see FIG. 3 for more details).

In box 202, for each system in the provisioning request (see box 104), the centralized provisioning system determines whether the access definitions (see box 102) are configured for that system. If so, the centralized provisioning system proceeds to box 204. If not, the centralized provisioning system proceeds to box 206.

In box 204, the centralized provisioning system determines whether the system in the request is participating in central user administration (CUA). If so, the centralized provisioning system proceeds to box 208. If not, the centralized provisioning system proceeds to box 210.

In box 206, the centralized provisioning system determines whether a global CUA is defined. If so, the centralized provisioning system proceeds to box 208. If not, the centralized provisioning system proceeds to box 210.

In box 208, the centralized provisioning system collects in a map of the CUA system to the child (recipient) systems. A specific example of this process is provided below. The centralized provisioning system proceeds to box 212.

In box 210, the centralized provisioning system performs non-CUA provisioning for the system by making a BAPI real time agent (RTA) call. (This may be referred to as an "uncollected BAPI call" to differentiate from the "collected BAPI call" discussed below.) The centralized provisioning system proceeds to box 212.

In box 212, the centralized provisioning system determines whether the request includes additional systems that have not yet been evaluated according to the process. If so, the centralized provisioning system returns to box 202. If not, the centralized provisioning system proceeds to box 214.

In box 214, using the map generated in box 208, the centralized provisioning system makes a provisioning call to the parent (sending) CUA system by passing on all the child systems' information in a collected RTA call.

Thus, by using the collected RTA call (see box 214), the number of BAPI calls can be reduced.

Consider the following example. Eight systems are present and are referred to as System1, System2, System3, System4, System5, System6, System7 and System9. A map of a CUA system to the child systems may contain the parent (sending) system as the key and all the child (receiving) systems for a particular parent (sending) system in a list as a value for this key.

Assume that System5 is the global CUA system; that there is no configuration defined for System1 and System3; that for System2, System4, System6 and System7 that the configuration is defined; that System9 is the parent system for System4, System6 and System 7; and that System2 is not participating in CUA.

Applying the process of FIG. 2 to the example, starting with System1, determine if a configuration exists (box 202). If the result of box 202 is yes, then determine whether System1 is participating in CUA (box 204). If the result of box 204 is no, then add System1 to the list of non-CUA systems (for non-CUA provisioning, box 210). If the result of box 204 is yes, then (box 208) create a list and store System1 in the list. Fetch the parent system of System1 and store the parent of System1 as the key and the list information as the value in the map.

If the result of box 202 is no, then determine whether a global CUA is defined (box 206). If the result of box 206 is no, then add System1 to the list of non-CUA systems (for non-CUA provisioning, box 210). If the result of box 206 is yes, then (box 208) fetch the list of child systems that are associated with the global CUA system. If there is no child system associated with the global CUA system, then create a new list and store System1 in the list, and add the global CUA system as a key in the map and the list of child systems for the global CUA system as the value.

And so on for the remaining systems.

As a result, the map of CUA systems to child systems will contain the following data:

System5(Key), {System1,System3}(Value)
System9(Key), {System4,System6,System7}(Value)
The list of non-CUA systems contains System2.

Thus, three provisioning BAPI calls may be made as a result of processing the example. One call provisions the user in System5 and subsystems (i.e., System1 and System3). A second call provisions the user in System9 and subsystems (i.e., System4, System6 and System7). A third call provisions the user in System2 (i.e., the non-CUA system).

These three calls may be contrasted with the seven calls that may be required in existing systems (i.e., not according to embodiments of the present invention). This reduces network traffic to backend systems. Furthermore, an embodiment of the present invention supports the provisioning of both CUA and non-CUA systems in a single request.

FIG. 3 is a block diagram of a client server environment 300 according to an embodiment of the present invention. The client server environment 300 includes a client 302 and one or more servers 304a, 304b, 304c and 304d (collectively "servers 304") connected via a network 306. The client 302 may be a computer that executes client side database application computer programs. The servers 304 may be computers that execute server side database application computer programs. The servers 304 may also store databases or data. The network 306 communicates information between the client 302 and the servers 304.

The server 304b includes a centralized provisioning system 308. The server 304b may be dedicated to the centralized provisioning system 308, or the server 304b may also implement other server side database application programs, databases, or data. The centralized provisioning system 308 may be implemented as a computer program executed by the server 304b. The centralized provisioning system 308 may implement all or part of the method 100 (see FIG. 1).

Figure 8:
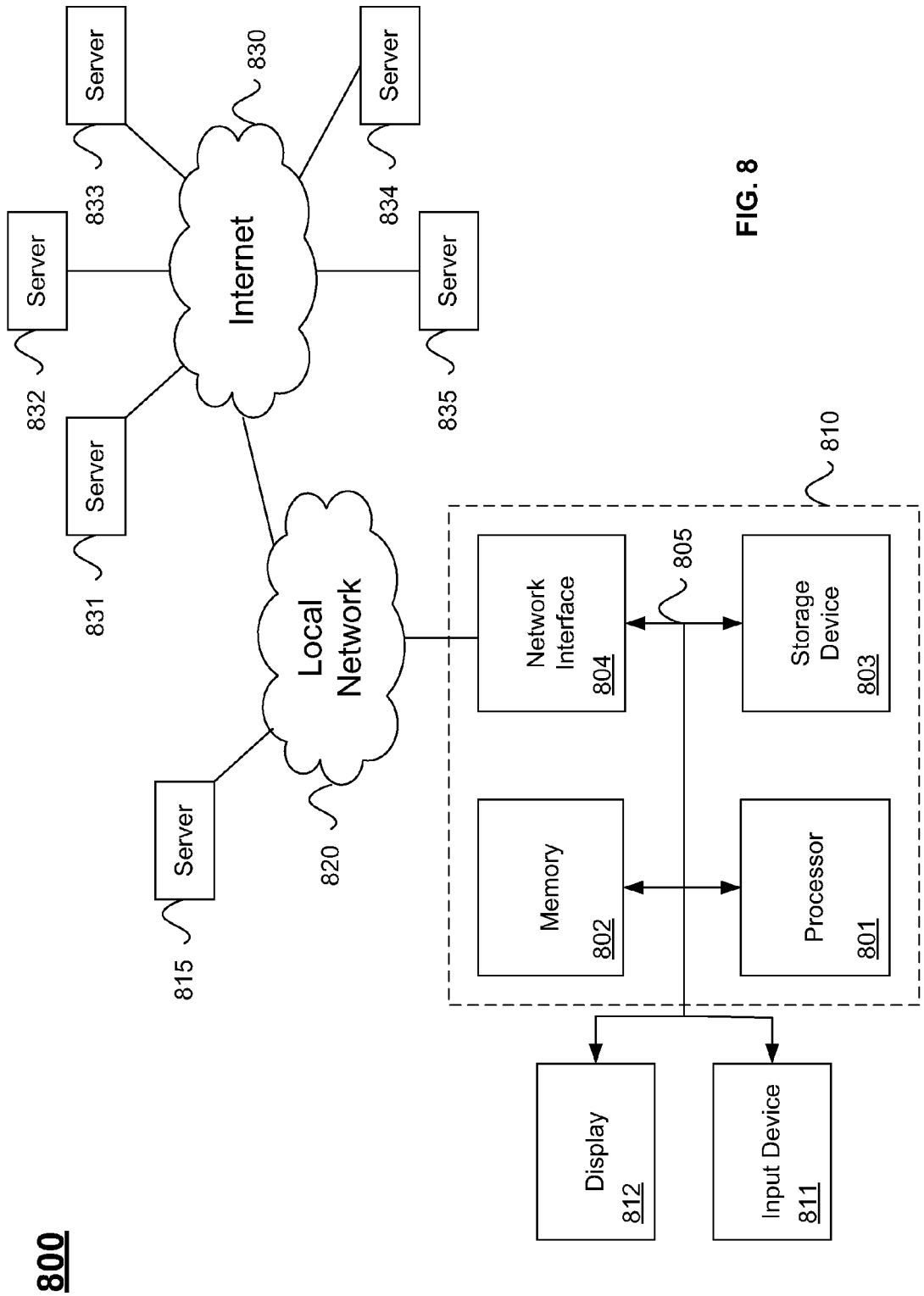
FIG. 8 is a block diagram of an example computer system and network for implementing embodiments of the present invention.

More specific hardware details of the client server environment 300 can be seen in FIG. 8.

Centralized Provisioning Service Details

As discussed above, an end user submitting a request for provisioning is abstracted from the complexities of the access scenarios (e.g., distributed access, centralized access, CUA, non-CUA, etc.) The user may generate a single request for provisioning. The centralized provisioning service may then consolidate this request as described above, allowing provisioning to happen with greater ease and security.

As discussed above, the centralized provisioning service supports multiple CUA environments, as well as both CUA and non-CUA environments. This is achieved, according to an embodiment, by functionality to configure a CUA at a global level, functionality to specify CUA at the system level, and functionality to define a system that is not participating in CUA. According to an embodiment, the defined system level takes precedence; if no value is defined at the system level, the centralized provisioning service uses the global level settings.

When the centralized provisioning service gets the call to provision to different systems, the centralized provisioning service uses the process of FIG. 2 to determine the optimal Business API (BAPI) calls. For each system that should be provisioned, based on the global and system level settings, it is determined whether it is part of a CUA or not, and the grouping or consolidation happens at the parent CUA system level. After the grouping, BAPI calls are made to the parent CUA systems by sending information regarding all the child systems associated with that CUA system for provisioning. For non-CUA systems, BAPI calls are made directly to these systems.

The centralized provisioning system may be configured in the manner further detailed below. An administrator has the ability to configure global settings and system settings. In the global settings, the administrator can identify a global CUA system, which is the CUA used for systems in a provisioning request that have not been otherwise provisioned (as a CUA system or as a non-CUA system). In the system settings, the administrator can define each individual system for provisioning as a CUA system or as a non-CUA system.

If the system is designated as a non-CUA system, then the centralized provisioning system uses the appropriate BAPI for provisioning a non-CUA system when providing access to that system.

If the system is designated as a CUA system, then the administrator may further designate the CUA with which that system is to be associated. According to an embodiment, when a system is associated with a CUA system, the centralized provisioning system inserts the CUA system data into the CUA table (CHILD_DATA) and updates the function template related data in the Function table (BAPI_MAP_SYS). The structure for these tables is shown in FIGS. 4A-4B.

FIGS. 4A-4B illustrate tables structures for CUA data according to an embodiment of the present invention. FIG. 4A illustrates the table structure for the table CHILD_DATA. FIG. 4B illustrates the table structure for the table BAPI_MAP_SYS.

Once a system has been defined in the system settings, the administrator can edit the information for that system, or may delete that system from the system settings.

Figure 5:
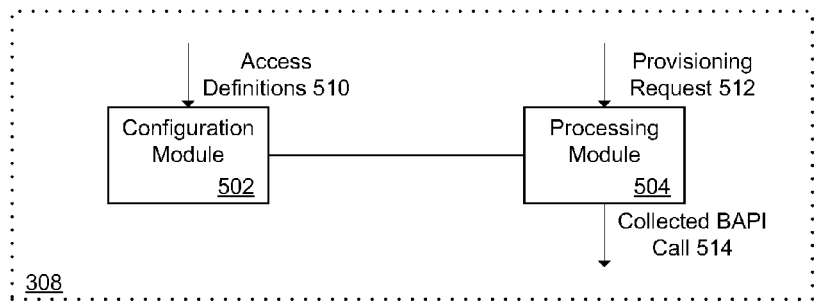
FIG. 5 is a block diagram that illustrates further details of the centralized provisioning system 308 (see FIG. 3).

FIG. 5 is a block diagram that illustrates further details of the centralized provisioning system 308 (see FIG. 3). The centralized provisioning system 308 includes a configuration module 502 and a processing module 504. The configuration module 502 and the processing module 504 may be implemented as computer programs that are executed by computers in a hardware client-server environment.

The configuration module 502 manages the access definitions 510 for the systems for which the centralized provisioning system 308 is managing access. An administrator may interact with the configuration module 502 to define global settings, to define system settings, to edit the settings for a system, to delete a system from the access definitions, etc.

The processing module 504 receives a provisioning request 512 and generates a collected BAPI call 514 according to the access definitions 510. The processing module 504 may execute the processes described above in FIG. 1 or FIG. 2. The processing module 504 may then provide the collected BAPI call 514 to the server (e.g., server 304b in FIG. 3) to use when provisioning access to a user.

Additional User Provisioning Details

The user provisioning process may be enhanced according to a further embodiment of the present invention. The user provisioning information may be included in the collected BAPI call discussed above (see FIG. 2).

An end user when submitting a request for provisioning can submit the request for provisioning into multiple systems. The type of provisioning that works for one system might not be applicable to the other system. In general there are two ways of assignment of roles to the user, directly and indirectly. In direct provisioning, the roles are assigned directly to the user. Whereas in indirect provisioning, roles will be assigned to an organization level parameter like position and position will be assigned to the user. If the employee changes, there is no need to assign the role to the new employee again, but only the position. In this way, the new employee automatically receives the roles assigned indirectly through the position. Other organization level parameters like Job, OrgUnit may also be considered besides position. In a complex scenario, the type might change from one system to another, as shown below in TABLES 1-2.

TABLE 1

| System | Provisioning | Parameter/Setting |
| --- | --- | --- |
| 1 | Indirect | Position |
| 2 | Indirect | Position |
| 3 | Indirect | Position |

TABLE 1 defines a global settings example scenario. The global settings define that the provisioning is indirect, and that the provisioning parameter is the user's position. The global settings are then applied when a particular system is provisioned.

TABLE 2

| System | Provisioning | Parameter/Setting |
| --- | --- | --- |
| 1 | Direct | Global |
| 2 | Direct | Global |
| 3 | Indirect | Job |
| 4 | Indirect | Position |

TABLE 2 defines a combination settings example scenario. The provisioning for Systems 1-2 is direct according to the global direct setting. The provisioning for System 3 is indirect with the user's job as the provisioning parameter, and for System 4 is indirect with the user's position as the provisioning parameter.

To accommodate these different scenarios, an embodiment of the present invention implements a system with two ways of configuration. The first way is a global setting that applies if no other setting is defined for a particular system. The second way is a system setting that may be used to override the global setting on a system by system basis. All the options that are available at the global level may be available at the system level also. The most common scenario followed may be defined as part of the global settings and the exceptional cases may be configured in the system level settings. According to an alternative embodiment, provisioning for each of the systems may be defined in the system level settings itself. In the above scenarios, for the first scenario (TABLE 1), defining Direct Provisioning at the global level should work fine. But for the second scenario (TABLE 2), Direct Provisioning may be defined at the global level; the system level configuration for System 3 and System 4 may be defined as Indirect Provisioning with the parameters Job and Position (respectively) specified as the provisioning parameters. During provisioning, a provisioning service evaluates the settings for each system in the request, as shown in FIG. 6.

Figure 6:
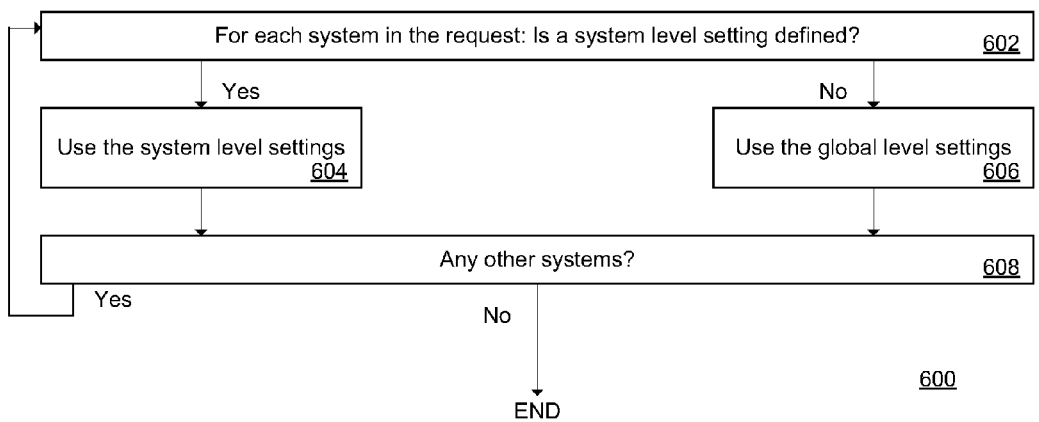
FIG. 6 is a flow diagram of a method of performing provisioning according to an embodiment of the present invention.

FIG. 6 is a flow diagram of a method 600 of performing provisioning according to an embodiment of the present invention. The method 600 may be implemented as one or more computer programs that are executed in a hardware client-server computing environment (such as shown in FIG. 3). The centralized provisioning system 308 may implement the method 600. The method 600 may be performed before, after, or intermixed with the boxes of the method 106 (see FIG. 2).

In box 602, for a particular system in the provisioning request, the centralized provisioning system determines whether a system level setting is defined. If so, the process proceeds to box 604. If not, the process proceeds to box 606. For example, using the scenario of TABLE 2, for System 1 or System 2 no system level setting is defined; for System 3 or System 4, a system level setting is defined.

In box 604, the centralized provisioning system uses the defined system level settings to determine the provisioning parameters. For example, using the scenario of TABLE 2, for System 3 the defined system level setting is to use the user's Job as the provisioning parameter; for System 4 the defined system level setting is to use the user's Position as the provisioning parameter.

In box 606, the centralized provisioning system uses the defined global level settings to determine the provisioning parameters. For example, using the scenario of TABLE 2, for System 1 the global setting is to use direct provisioning. (The system level settings and global level settings may be referred to collectively as "access settings".)

In box 608, for each other system in the provisioning request, the centralized provisioning system returns to box 602 and performs the boxes for that system.

Once the centralized provisioning system has used the access settings for each system to determine the provisioning parameters, the centralized provisioning system provisions access for the user according to the provisioning parameters. These provisioning parameters may be included in the collected BAPI call (see FIG. 2).

Figure 7:
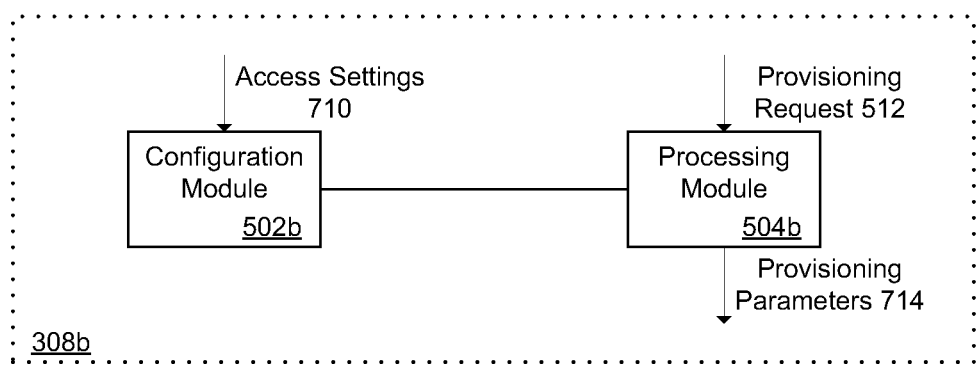
FIG. 7 is a block a block diagram that illustrates further details of a centralized provisioning system.

FIG. 7 is a block a block diagram that illustrates further details of a centralized provisioning system 308*b*. The centralized provisioning system 308*b* is similar to the centralized provisioning system 308 (see FIG. 3 and FIG. 5), with the addition of functionality that implements the method 600 (see FIG. 6). The discussion of details present in FIG. 5 is not repeated.

The configuration module 502*b* manages the access settings 710 for the systems for which the centralized provisioning system 308*b* is managing access. An administrator may interact with the configuration module 502*b* to define global level settings, to define system level settings, to define provisioning parameters, to edit the settings for a system, to delete a system from the access settings, etc.

The processing module 504*b* receives the provisioning request 512 and determines the provisioning parameters 714 according to the access settings 710. The processing module 504*b* may execute the processes described above in FIG. 6. The processing module 504*b* may include the provisioning parameters 714 in the collected BAPI call 514 (see FIG. 5).

FIG. 8 is a block diagram of an example computer system and network 800 for implementing embodiments of the present invention. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques or embodying the constructs above, for example.

Computer system 810 may be coupled via bus 805 to an output device 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831, 832, 833, 834 and 835 across the network. A server 831 may transmit actions or messages from one component, through Internet 830, local network 820, and network interface 804 to a component on computer system 810.

According to an embodiment, the client 302 (see FIG. 3) may be implemented by the computer system 810. The server 304b (see FIG. 3) may be implemented by the server 831, which may include internal components similar to those of the computer system 810.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of reducing a quantity of business application programming interface calls in a hardware client-server environment, wherein the client and server both contain a processor and a memory, comprising:
 configuring a centralized provisioning system on a hardware server with a plurality of access definitions for a plurality of systems, wherein the plurality of systems includes a parent system and a plurality of child systems, wherein the plurality of systems implement a technical level and a business level abstracted above the technical level, wherein the plurality of systems exchange business data via a plurality of business application programming interfaces that are a set of interfaces to object-oriented programming methods that allow object-oriented access to the plurality of systems through the object-oriented programming methods according to a plurality of business object types, wherein the plurality of business application programming interfaces operate at the business level as opposed to the technical level, and wherein the plurality of business application programming interfaces are implemented and stored in the plurality of systems as a plurality of remote function call modules;
 receiving, by the centralized provisioning system, a provisioning request for a user of a client system to access at least two of the plurality of child systems;
 determining a collected business application programming interface call from the client system, according to the plurality of access definitions; and
 determining, by the centralized provisioning system, whether the system in the provisioning request participates in central user administration,
  if the system participates in central user administration, the collected business application programming interface call collects at least two business application programming interface calls to the at least two of the plurality of child systems into a single business application programming interface call to the parent system, and the centralized provisioning system provides access to the user to the at least two of the plurality of child systems according to the collected business application programming interface call to the parent system, and
  if the system does not participate in central user administration, the centralized provisioning system performs non-central user administration provisioning for the system by making a business application programming interface real time agent call that provides access to the user.

2. The method of claim 1, wherein configuring the centralized provisioning system comprises:
 configuring a global level configuration.

3. The method of claim 1, wherein configuring the centralized provisioning system comprises:
 configuring a global level configuration; and
 configuring a plurality of system level configurations.

4. The method of claim 1, wherein determining the collected business application programming interface call comprises:
 generating a map of the plurality of systems that includes the parent system and the plurality of child systems; and
 determining the collected business application programming interface call according to the map.

5. The method of claim 1, wherein determining the collected business application programming interface call comprises:
 determining whether a system level configuration is defined;
 determining whether a global level configuration is defined; and
 determining the collected business application programming interface call according to the system level configuration and the global level configuration.

6. The method of claim 1, further comprising:
 configuring the centralized provisioning system with a plurality of access settings for the plurality of systems;
 determining a plurality of provisioning parameters for the plurality of systems according to the plurality of access settings; and
 providing access to the user according to the plurality of provisioning parameters.

7. The method of claim 6, wherein the plurality of access settings includes a global level setting and a plurality of system level settings.

8. The method of claim 6, wherein the plurality of provisioning parameters includes at least one of a direct provisioning parameter and an indirect provisioning parameter.

9. The method of claim 1, wherein the provisioning request corresponds to a plurality of business application programming interface calls, and wherein the collected business application programming interface call results in a reduced quantity of business application programming interface calls as compared to the plurality of business application programming interface calls.

10. The method of claim 1, wherein the provisioning request corresponds to a request to access a plurality of business objects managed by the plurality of systems, and wherein providing access comprises:
providing access, to the user, to the plurality of business objects according to the collected business application programming interface call.

11. A centralized provisioning system that reduces a quantity of business application programming interface calls in a hardware client-server environment, wherein the client and server both contain a processor and a memory, comprising:
a hardware server that implements the centralized provisioning system;
a configuration module, implemented by the hardware server, that configures the centralized provisioning system with a plurality of access definitions for a plurality of systems, wherein the plurality of systems includes a parent system and a plurality of child systems, wherein the plurality of systems implement a technical level and a business level abstracted above the technical level, wherein the plurality of systems exchange business data via a plurality of business application programming interfaces that are a set of interfaces to object-oriented programming methods that allow object-oriented access to the plurality of systems through the object-oriented programming methods according to a plurality of business object types, wherein the plurality of business application programming interfaces operate at the business level as opposed to the technical level, and wherein the plurality of business application programming interfaces are implemented and stored in the plurality of systems as a plurality of remote function call modules; and
a processing module, implemented by the hardware server, that receives a provisioning request for a user of a client system to access at least two of the plurality of child systems, that determines a collected business application programming interface call from the client system, according to the plurality of access definitions, and that determines whether the system in the provisioning request participates in central user administration,
if the system participates in central user administration, the collected business application programming interface call collects at least two business application programming interface calls to the at least two of the plurality of child systems into a single business application programming interface call to the parent system, and the hardware server provides access to the user to the at least two of the plurality of child systems according to the collected business application programming interface call to the parent system, and
if the system does not participate in central user administration, the hardware server performs non-central user administration provisioning for the system by making a business application programming interface real time agent call that provides access to the user.

12. The centralized provisioning system of claim 11, wherein configuring the centralized provisioning system comprises:
configuring a global level configuration.

13. The centralized provisioning system of claim 11, wherein configuring the centralized provisioning system comprises:
configuring a global level configuration; and
configuring a plurality of system level configurations.

14. The centralized provisioning system of claim 11, wherein determining the collected business application programming interface call comprises:
generating a map of the plurality of systems that includes the parent system and the plurality of child systems; and
determining the collected business application programming interface call according to the map.

15. The centralized provisioning system of claim 11, wherein determining the collected business application programming interface call comprises:
determining whether a system level configuration is defined;
determining whether a global level configuration is defined; and
determining the collected business application programming interface call according to the system level configuration and the global level configuration.

16. The centralized provisioning system of claim 11, wherein the configuration module configures the centralized provisioning system with a plurality of access settings for the plurality of systems, and
wherein the processing module determines a plurality of provisioning parameters for the plurality of systems according to the plurality of access settings, and provides access to the user according to the plurality of provisioning parameters.

17. The centralized provisioning system of claim 16, wherein the plurality of access settings includes a global level setting and a plurality of system level settings.

18. The centralized provisioning system of claim 16, wherein the plurality of provisioning parameters includes at least one of a direct provisioning parameter and an indirect provisioning parameter.

19. The centralized provisioning system of claim 11, wherein the provisioning request corresponds to a plurality of business application programming interface calls, and wherein the collected business application programming interface call results in a reduced quantity of business application programming interface calls as compared to the plurality of business application programming interface calls.

20. The centralized provisioning system of claim 11, wherein the provisioning request corresponds to a request to access a plurality of business objects managed by the plurality of systems, and wherein providing access comprises:
providing access, to the user, to the plurality of business objects according to the collected business application programming interface call.

21. A non-transitory computer program product, comprising a computer readable medium having a computer readable program code embodied therein, that when executed by a hardware server, reduce a quantity of business application programming interface calls in a hardware client-server environment, wherein the client and server both contain a processor and a memory, comprising:
a configuration module that configures the hardware server to implement a centralized provisioning system with a plurality of access definitions for a plurality of systems, wherein the plurality of systems includes a parent system and a plurality of child systems, wherein the plurality of systems implement a technical level and a business level abstracted above the technical level, wherein the plurality of systems exchange business data via a plurality of business application programming interfaces that are a set of interfaces to object-oriented programming methods that allow object-oriented access to the plurality of systems through the object-oriented programming methods according to a plurality of business object types, wherein the plurality of business application programming interfaces operate at the business level as opposed to the technical level, and wherein the plurality of business application programming interfaces are implemented and stored in the plurality of systems as a plurality of remote function call modules; and a processing module that receives a provisioning request for a user of a hardware client system to access at least two of the plurality of child systems, that determines a collected business application programming interface call from the client system, according to the plurality of access definitions, and that determines whether the system in the provisioning request participates in central user administration, if the system participates in central user administration, the collected business application programming interface call collects at least two business application programming interface calls to the at least two of the plurality of child systems into a single business application programming interface call to the parent system, and the hardware server provides access to the user to the at least two of the plurality of child systems according to the collected business application programming interface call to the parent system, and if the system does not participate in central user administration, the hardware server performs non-central user administration provisioning for the system by making a business application programming interface real time agent call that provides access to the user.

22. The non-transitory computer program product of claim 21, wherein:

the configuration module configures the centralized provisioning system with a plurality of access settings for the plurality of systems;

the processing module determines a plurality of provisioning parameters for the plurality of systems according to the plurality of access settings; and the processing module provides access to the user according to the plurality of provisioning parameters.

23. The non-transitory computer program product of claim 22, wherein the plurality of access settings includes a global level setting and a plurality of system level settings.

24. The non-transitory computer program product of claim 22, wherein the plurality of provisioning parameters includes at least one of a direct provisioning parameter and an indirect provisioning parameter.

25. The non-transitory computer program product of claim 21, wherein configuring the centralized provisioning system comprises:

configuring a global level configuration.

26. The non-transitory computer program product of claim 21, wherein configuring the centralized provisioning system comprises:

configuring a global level configuration; and configuring a plurality of system level configurations.

27. The non-transitory computer program product of claim 21, wherein determining the collected business application programming interface call comprises:

generating a map of the plurality of systems that includes the parent system and the plurality of child systems; and determining the collected business application programming interface call according to the map.

28. The non-transitory computer program product of claim 21, wherein determining the collected business application programming interface call comprises:

determining whether a system level configuration is defined;

determining whether a global level configuration is defined; and determining the collected business application programming interface call according to the system level configuration and the global level configuration.

29. The non-transitory computer program product of claim 21, wherein the provisioning request corresponds to a plurality of business application programming interface calls, and wherein the collected business application programming interface call results in a reduced quantity of business application programming interface calls as compared to the plurality of business application programming interface calls.

30. The non-transitory computer program product of claim 21, wherein the provisioning request corresponds to a request to access a plurality of business objects managed by the plurality of systems, and wherein providing access comprises:

providing access, to the user, to the plurality of business objects according to the collected business application programming interface call.

\* \* \* \* \*